United States Patent [19]

Lents et al.

[11] 4,148,293

[45] Apr. 10, 1979

[54] SOLAR ENERGY RECEPTOR APPARATUS

[76] Inventors: James M. Lents, 2938 Old Britain Cir., Chattanooga, Tenn. 37407; Barry V. Rhodes, Sr., Rte. #1, Johnson Rd., Chickamauga, Ga. 30707

[21] Appl. No.: 784,232

[22] Filed: Apr. 4, 1977

Related U.S. Application Data

[62] Division of Ser. No. 533,254, Dec. 16, 1974, abandoned.

[51] Int. Cl.$^2$ ............................................. F24J 3/02
[52] U.S. Cl. ................................... 126/270; 126/271
[58] Field of Search ............... 165/166; 126/270, 271; 237/1 A

[56] References Cited

U.S. PATENT DOCUMENTS

| 1,424,932 | 8/1922 | Moreau | 126/271 |
| 1,891,434 | 12/1932 | McKean et al. | 165/166 |
| 2,448,648 | 9/1948 | Zideck | 126/271 |
| 3,102,532 | 9/1963 | Shoemaker | 126/270 |
| 3,390,672 | 7/1968 | Snelling | 126/271 |
| 3,719,227 | 3/1973 | Jenssen | 165/166 |
| 3,961,619 | 6/1976 | Estes et al. | 126/271 |

*Primary Examiner*—Kenneth W. Sprague
*Attorney, Agent, or Firm*—Jones, Thomas & Askew

[57] ABSTRACT

A solar heating system operating on a phase-change cycle and suitable for operation in buildings. A solar heating panel is positioned to receive solar energy, and fluid passages within the panel are connected in a sealed closed fluid system. The closed fluid system is charged with a fluid medium which is vaporized by solar heating occurring in the solar panel. The heated vaporized fluid flows through energy extraction devices which do work while utilizing energy extracted from the vapor. The vaporized fluid flows to a condensor in heat exchange relation with a heat storage medium, such as a tank of water. The heat of vaporization given out by the condensing vapor is supplied to the heat storage medium, and heat can then be withdrawn from storage for space heating or for other purposes. The solar heating panel can be a composite structure fabricated from rolled sheet metal, which provides a substantial reduction in unit cost of the heating panel. The solar heating panel can also be used to provide direct heating of air.

4 Claims, 7 Drawing Figures

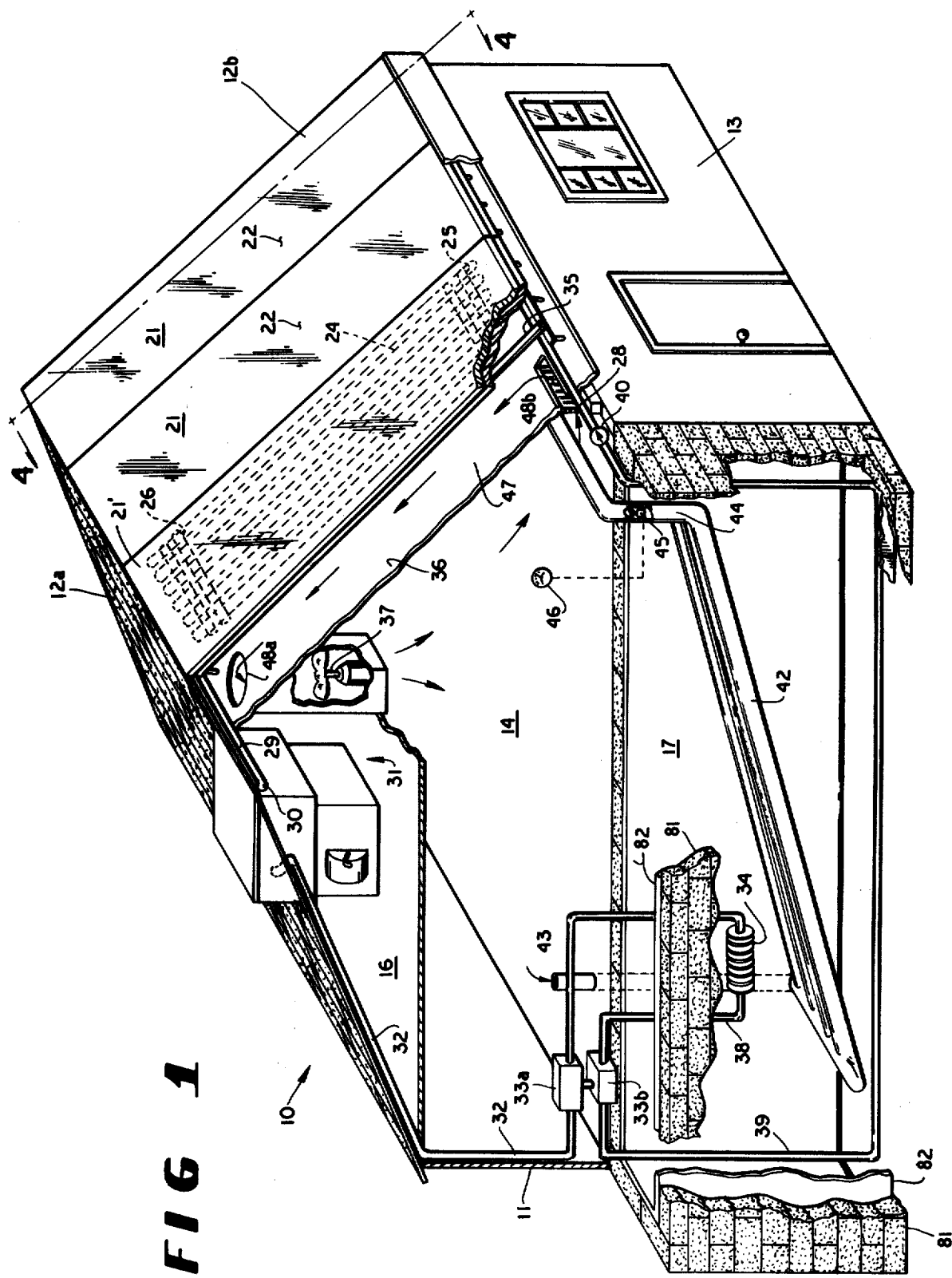

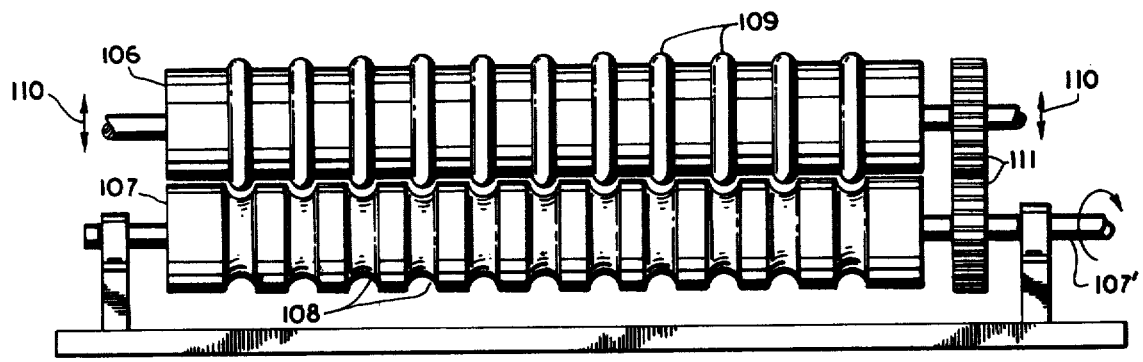
FIG 3
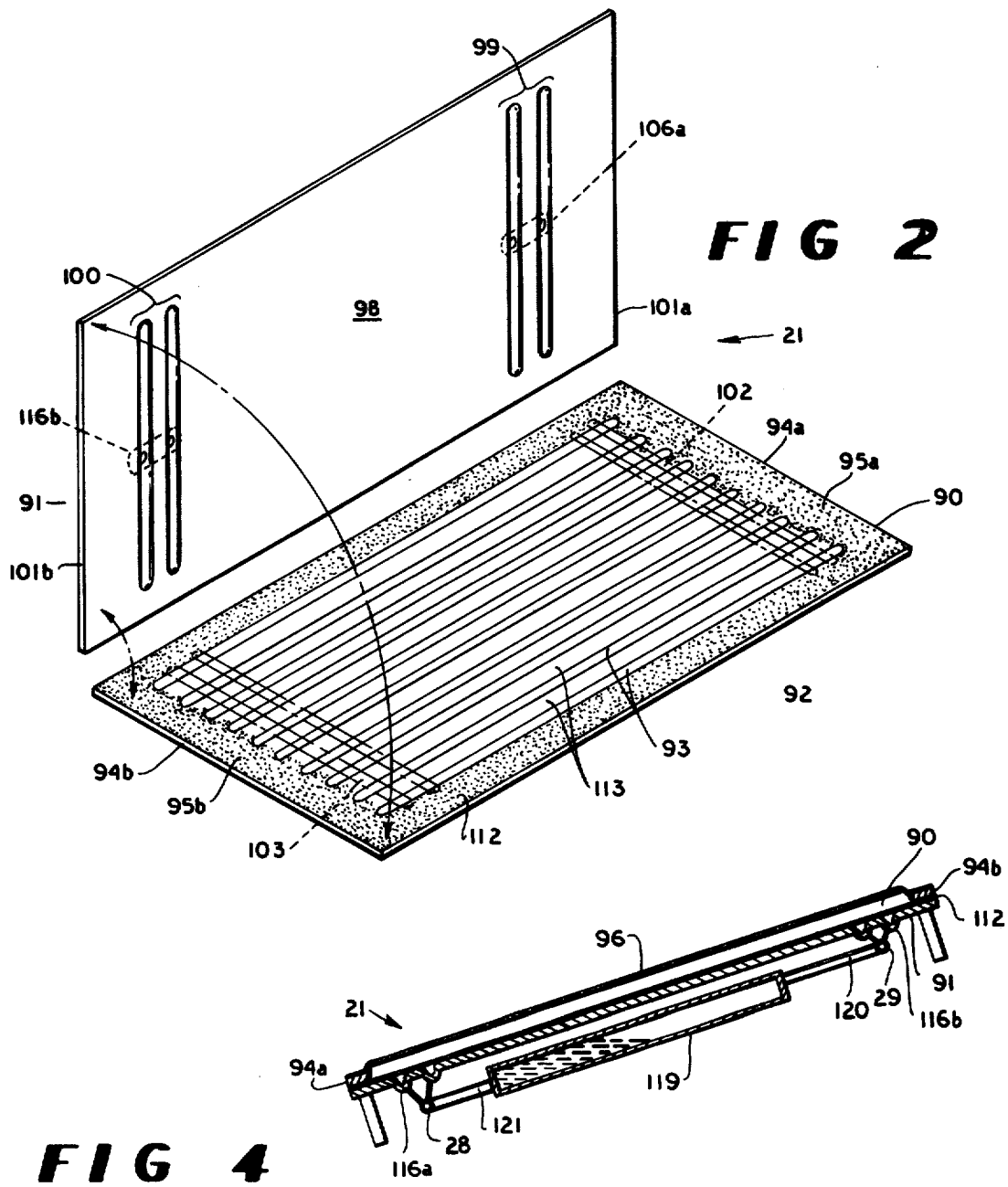
FIG 2
FIG 4

SOLAR ENERGY RECEPTOR APPARATUS

This is a division of application Ser. No. 533,254, filed Dec. 16, 1974, now abandoned.

This invention relates in general to solar energy and in particular to a solar heating system and components of such systems.

The use of freely-available energy from the sun to provide at least a portion of the world's energy requirements has been a goal which is frequently sought but which has not yet been practically attained. While it is estimated, for example, that a square mile of the earth's surface in the southern United States will receive about 50 billion BTU of energy on a clear day, techniques are unavailable for trapping, storing, and efficiently utilizing large amounts of solar energy in a manner which is competitive with other energy sources, most notably, hydrocarbon energy sources.

The economics and the feasibility of practical solar energy conversion and utilization are, however, being seriously examined in light of current concern about energy problems, with particular awareness that there are only finite supplies of the hydrocarbon fuels which are used extensively for home heating purposes throughout much of the world.

Prior art techniques for capturing solar energy have generally utilized either flat plate collectors or focusing collectors. Focusing collectors, which commonly employ some type of reflecting lens and/or mirror such as a parabolic reflector, must be repositioned constantly, or at least frequently, to track the position of the sun throughout each day. Such focusing collectors, while useful in laboratory conditions which provide the equipment necessary for tracking, are impractical for use in home heating systems or other solar heating applications in which capital cost and operational reliability are important considerations. Flat plate collectors, which typically utilize air or water as a working medium, are less expensive than focusing collectors to manufacture, and can generally be positioned to present an acceptable effective "capture" area for receiving solar radiation without the need for tracking or positioning mechanisms.

A significant disadvantage of flat plate collectors has been the relatively large surface area required to obtain heat energy sufficient for practical heating applications in, for example, one or two-story dwelling structures. Utilizing water as a working liquid having specific heat of one BTU/pound, it has been found that extensive collector areas and expensive water recirculation pumps and associated equipment are required in prior art solar heating systems which are capable of providing heating capacity sufficient to make a significant contribution to the space-heating requirements of a dwelling structure of average size.

Accordingly, it is an object of the present invention to provide an improved system for converting solar energy into energy useful for space heating.

It is another object of the present invention to provide a solar heating system which converts solar energy into space heating energy through the use of a liquid-vapor-liquid phase change.

It is another object of the present invention to provide a solar heating system using improved solar collector panels of novel and inexpensive construction.

Other objects and attendant advantages of the present system and apparatus will become apparent from the following discussion of a disclosed preferred embodiment, including the figures in which:

FIG. 1 shows a pictorial view, partially broken-away for illustrative purposes, of a building equipped with a solar heating system according to a disclosed embodiment of the present invention;

FIG. 2 shows an exploded section view of a solar energy collecting panel according to the disclosed embodiment;

FIG. 3 shows fragmentary view of apparatus useful for making the panel shown in FIG. 2;

FIG. 4 shows an elevation view of the assembled panel of FIG. 3;

Figure 5:
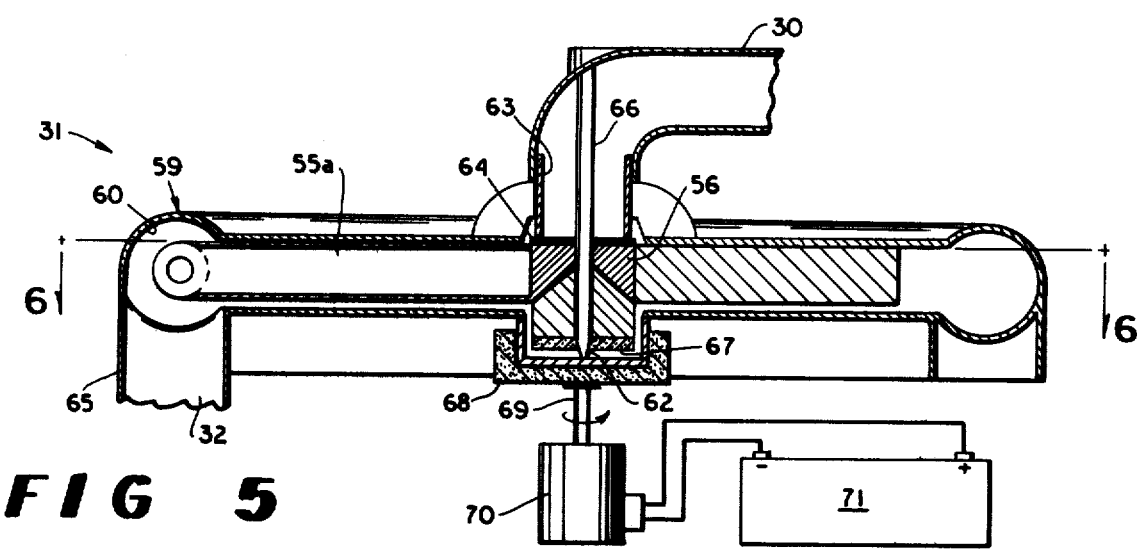
FIG. 5 shows a section view of a vapor-driven turbine used in the disclosed embodiment of the present invention.

Stated in general terms, the system of the present invention comprises a closed-cycle fluid system including a solar collection panel and containing a liquid which is vaporizable at temperatures readily attained by solar heating of the collection panel. Each unit of working liquid thus receives a far-greater amount of heat energy, in latent heat of vaporization, than would otherwise be received merely by heating the liquid to an elevated temperature without vaporization. A portion of the energy present in the vapor may be utilized to do work, such as by a vapor-drive turbine. The vapor is condensed to give up heat of vaporization to a storage medium, from which the heat is extracted as required for space heating or other purposes. In a particular embodiment of the invention, inclined heating air ducts are disposed within the heat storage medium, and heat imparted to the air in the inclined ducts causes a heat-induced convection movement of air for recirculation into a space being heated.

The present invention is specifically described with respect to the disclosed embodiment shown in the Figures. Referring to FIG. 1, there is shown generally at 10 a housing structure containing a solar heating system according to an embodiment of the present invention. The structure 10 has an exterior wall 11 and a roof comprising a first roof portion 12a and a second roof portion 12b. The roof portions may be asymmetrical with respect to each other, so as to provide the roof portion 12b with an overall area which is greater than the area of the roof portion 12a. The structure 10 includes another wall 13, and an interior space indicated generally at 14. It will be understood, of course, that the interior space 14 will, in actual construction, typically be divided into a number of rooms by partitions, in the conventional manner. The interior space 14 is topped by a ceiling 15 defining an attic space 16 beneath the roof portions 12a and 12b. Disposed at one side of the space 14 is a liquid storage reservoir 17 which is described in greater detail below.

A number of solar heating panels 21 are disposed on the roof of the structure to cover substantially the entire area of the roof portion 12b. The solar heating panels 21 are described below in greater detail, but it will be seen that each of these panels has a transparent cover 22 which allows the rays of the sun to enter and heat an internal structure containing a number of fluid passages which extend generally parallel to the direction of slant of the roof portion 12b. It will be appreciated by those skilled in the art that the roof portion 12b, on which the solar heating panels 21 are arrayed, should be geographically oriented for maximum exposure to the rays of the sun throughout the year, with particular emphasis on maximizing solar exposure during the winter months when heating requirements are greatest.

Each of the solar heating panels 21, as previously mentioned, contains a number of longitudinal channels, and such longitudinal channels are depicted at 24 in the solar heating panel 21' shown in broken-away form in FIG. 1. The channels 24 extend substantially the length of the solar heating panel and provide fluid flow passages therealong. The channels 24 are joined at the lower end of the panel 21' by a transverse channel 25, and are similarly joined together at the upper end of the panel 21' by one or more transverse channels 26.

A header conduit 28 extends along the width of the array of solar heating panels 21 adjacent the lower ends of the panels, and the header conduit 28 is in fluid flow communication with the corresponding transverse channel 25 on each of the panels. The header conduit 28 is hereinafter identified as a "liquid header" for reasons which will become apparent below. Another header conduit 29 extends along the width of the solar heating panel array adjacent the upper ends of the panels, and is in fluid flow communication with the transverse channel 26 of each panel. The header conduit 29 is hereinafter known as the "vapor header".

The vapor header 29 is connected by a conduit 30 to the inlet of an energy extraction device such as the turbine 31, which may be connected to drive an electrical generator as described hereinbelow. The exhaust side of the turbine 31 is connected to a conduit 32 which extends to a suitable vapor-driven motor 33a which provides operating power to a liquid pump 33b liquid pump 33. The vapor output of the pump 33a is connected to a vapor condenser 34, which is disposed in the liquid storage volume 17. The condenser 34 may be provided by an array of conduit within the liquid storage volume, providing sufficient conduit surface area for heat transfer from vapor within the condenser 34 to a body of liquid received in the liquid storage volume.

The outlet end of the condenser 34 is connected by the conduit 38 to the inlet of the liquid pump 33b, and the pumped liquid output of the pump 33b is connected by way of the conduit 39 for return to the liquid header 28. A check valve 40 is inserted in the conduit 39 to allow one-way flow of pumped liquid only toward the liquid header 28.

Considering the operation of the system as described thus far, it is initially assumed that the longitudinal channels 24 in each of the solar heating panels 21 are filled, along at least most of the channel length, with a suitable liquid which has a boiling point sufficiently low to permit vaporization of the liquid at temperatures attained by solar heating of the liquid within the channels 24. Appropriate for use in the closed system of the present invention include, by way of example only, trichloroethane, having a boiling point of 165° F. and a heat of vaporization of 104 BUT/lb; methanol, having a boiling point of 148° F. and heat of vaporization of 527 BTU/lb; and water, having an atmospheric boiling point of 212° F. and a heat of vaporization of 1000 BTU/lb. Water is particularly desirable as a working liquid in the present system, because of its relatively high heat of vaporization and nontoxicity, and the entire liquid-vapor closed recirculation system as thus described is preferably operated with a water working liquid maintained at a subatmospheric pressure sufficient to lower the boiling point of the water to a temperature which is more readily attained by solar heating in the panels 21. By way of specific example, water maintained at a pressure of about 5 psia has a boiling point of about 150° F., which is satisfactory for the disclosed embodiment of the present system. It will be understood, of course, that a solar heating system of the type disclosed herein using water as a working liquid must also contain a suitable quantity of antifreeze material, in solution with the water, to lower the freezing temperature sufficiently so that the liquid in the solar panels will not freeze during nighttime or other conditions of non-heating exposure to subfreezing temperatures.

Assuming that the solar heating panels 21 are receiving sufficient solar energy to heat the liquid within the panels 24 to the boiling point, vapor evolves from the liquid and flows upwardly through the channels 24 for collection at the upper channels 26 of the heating panels. Vapor from the channels 26 is collected in the vapor header 29, and flows to the turbine 31 (if provided) to perform useful work. The vapor then flows from the turbine 31 through the conduit 32 to drive the vapor-operated motor 33a which powers the liquid pump 33b. It will be understood that the pump 33b, when operated in response to the presence of vapor pressure in the disclosed system, pumps condensed liquid through the liquid header 28 for return to the channels 24 in the solar heating panels, thereby maintaining the level of liquid in the solar heating panels. The vapor flows from the motor 33a into the condenser 34, whereat the vapor returns to the liquid state while giving up its heat of vaporization to the liquid contained in the liquid storage volume 17. The liquid in the volume 17 functions as a heat collection and storage medium, and it will be seen that the temperature of the heat storage liquid in the volume 17 is normally below the vaporization temperature of the working liquid in the closed vapor-liquid system. Heat may additionally be transferred from the condensed working liquid to the heat storage liquid, resulting in lowering of the condensed liquid temperature below the boiling point temperature, although the amount of heat transferred from the working medium to the storage medium through temperature change of the working liquid is normally only a fractional part of the heat transferred through the phase-change cycle of the working liquid.

It will be apparent from the foregoing discussion that the liquid storage medium within the storage volume 17 is heated by transfer of heat energy from the solar heating panels by the phase-change operating cycle of the heat transfer fluid. The heat received and stored in the storage medium can be extracted by a number of different techniques, one of which requires the provision of air flow ducts 42 which extend through the storage volume 17 at a slanted angle with respect to horizontal. The lowermost ends of the ducts 42 are connected through an air return duct 43 to the interior space 14, while the uppermost ends of the slanted ducts 42 are connected to an air supply duct 44 in communication with the interior space. Since the ducts 42 are surrounded by the heated storage medium within the tank 17, the air within the ducts 42 becomes heated and tends to rise, thereby flowing through the ducts 42 toward the uppermost ends thereof. This thermally-induced upward movement of air through the ducts 42 causes the heated air to flow through the supply duct 44 to the interior space 14 of the structure 10, and also withdraws air from the interior space through the return duct 43 for entry into the ducts 42. It will be seen, accordingly, that the present system is capable of providing thermally-induced air recirculation throughout the space being heated. An auxiliary fan 45 may be positioned within the supply duct 44, if desired, and connected to a thermostat 46 to augment the amount of thermally-induced air flow through the ducts 42. The ducts 42 can also be provided with thermostatically-controlled damper valves to regulate the flow of heated air in response to the temperature in the space 14.

Those skilled in the art will recognize that alternative techniques can be employed to utilize the heat received and stored in the storage medium. The liquid storage medium can, for example, be pumped through a conventional heat exchanger such as a radiator which is suitably positioned to heat the air within the interior space 14.

Additional heating from the solar panels 21 is obtainable by mounting the solar panels on spacing elements such as the strips 35 disposed on the surface 36, so that elongate open passages 47 are defined by the surface 36, the strips 35, and the under side of the panels 21. A blower 37 is disposed to pull air into the space 14 through the opening 48a in communication with the passage 47. Air in the space 14 is returned to the passage 47 through the opening 48b at the lower end of the passage. Solar heating of the panel 21 causes the air within the passage 47 to be heated, even when the panel temperature is below the liquid vaporization temperature, and the heated air is circulated throughout the space 14 by means of the blower 37.

Although the several solar heating panels 21 may be provided by any suitable liquid-conductive structure which provides sufficient capture and utilization of solar radiation to vaporize the selected working liquid in the closed system, a particularly useful and relatively inexpensive solar heating panel is shown in detail at FIGS. 2-4. The solar heating panel 21, as shown in FIG. 2, has a bottom sheet 90 and a top sheet 91 which are normally connected to each other in confronting relation, and which are depicted in exploded view in FIG. 2. The underside 92 of the bottom sheet 90 has a number of elongate channels 93 which take the form of depressed deformations in the underside 92 and which extend longitudinally along most of the lengths of the bottom sheet. The elongate channels 93 terminate short of the ends 94a and 94b of the bottom sheet, leaving respective undeformed margins 95a and 95b between the ends of the elongate channels and the adjacent end of the bottom sheet.

The top sheet 91 has one or more first transverse channels 99, located proximate a first end 101a of the top sheet, and one or more second transverse channels 100, located adjacent the second end 101b of the top sheet. Each of the transverse channels define depressions in the underside 98. The first transverse channels 99 are formed on the top sheet 91 at a location which, when the bottom sheet 90 and top sheet 91 are sandwiched together as shown in FIG. 4, places the one or more channels 99 in transverse relation over each of the elongate channels 93, adjacent the end 94a of the bottom panel. The approximate relation of the overlying first transverse channels 99 is shown in phantom view at 102 in FIG. 2. The one or more second transverse channels 100 are similarly positioned on the top sheet 91 to be in transverse overlying relation with the elongate channels 93 adjacent the second end 94b of the bottom sheet 90, when the top and bottom sheets are sandwiched together. The overlying position of the second transverse channels 100 is shown in phantom at 103 in FIG. 2.

Although the elongate channels 93 can be formed in the bottom sheet 90 in any suitable manner, one apparatus for forming such channels is shown in FIG. 3 and includes a pair of rolls 106 and 107. The bottom roll 107 is suitably journalled for rotation, and has a number of annular peripheral grooves 108 formed at spaced-apart intervals along the length of the roll. The top roll 106 is also mounted for rotation by any suitable journal means (not shown), and has a corresponding number of peripheral annular protrusions 109. The grooves 108 and the protrusions 109 are mutually receivable within one another, as shown in FIG. 3. The top roll 106, in addition to being journalled for rotation, is also mounted to be selectively movable in a direction toward and away from the bottom roll 107, as denoted by the arrows 110 in FIG. 3, and meshing drive gears 111 interconnects the shaft of the two rolls so that rotational force applied to the shaft 107' of the roll 107 causes the rolls to rotate in counter-rotating direction to each other.

In the manufacture of a bottom sheet 90 with the apparatus shown in FIG. 3, the top and bottom rolls are separated from one another and a sheet of any suitable bottom sheet material, such as aluminum, is disposed between the rolls with a first margin of length 95a, for example, extending through the rolls. The rolls 106 and 107 are then moved together until only a predetermined amount of clearance remains between the confronting grooves 108 and protrusions 109. The shaft 107' is then rotated by any suitable motive force, and it will be understood that the sheet of material is moved between the two rolls while the peripheral grooves 108 and protrusions 109 deform the sheet to provide the desired elongate channels 93. Rotation of the rolls is stopped when only the marginal extent 95b of the sheet remains, after which the two rolls are separated and the sheet is withdrawn. It will be understood that similar apparatus and techniques are used to provide the transverse channels 99 and 100 in the top sheet 91.

After a top sheet and bottom sheet of desired configuration are prepared, a layer of suitable bonding material 112 is applied to the underside 92 of the top sheet 90 around the circumferential extent of the underside. As will be apparent, bonding material may not be required on the non-deformed areas 113 between adjacent elongate channels 93. The bonding material 112 should be a material which provides the necessary bonding and fluid-tight sealing of the two panels, while maintaining sufficient elasticity to accommodate the thermal expansion and contraction of the panels during solar heating and subsequent cooling cycles. A suitable bonding adhesive is silicon rubber. The top and bottom sheets are then pressed together in proper orientation while the adhesive material cures, after which the resulting panel 21 is ready for installation and use.

The first transverse channels 99 of each panel 21 comprise the transverse channel 25 of FIG. 1, and the second transverse channels 100 similarly comprise the transverse channel 26. Each of the transverse channels 99 and 100, for each panel 21, is equipped with suitable conduit fittings 116a, 116b, (FIG. 4) enabling the transverse channels to be connected to the liquid header 28 and the vapor header 29, respectively, when the solar panels 21 are installed as shown in FIG. 1.

Assuming that the solar panels as thus described are used in a closed system operating at subatmospheric pressure, it will be seen that the maintenance of a subatmospheric operating pressure within the elongate and transverse channels of each panel causes an atmospheric pressure-induced force which urges the bottom sheet 90 and the top sheet 91 toward each other. This force tends to place the areas 113 of the bottom sheet, which were not bonded to the top sheet in the disclosed embodiment, into fluid tight sealing with the confronting undeformed areas on the underside 98 of the top sheet 91, thereby providing the necessary fluid-tight seal of the solar panel while allowing for differential thermal expansion of the top and bottom sheets.

It should be understood that the solar panels of the present invention can also be used with systems intended for operation at atmospheric or superatmospheric pressure, in which case the areas 113 of the bottom panel must be bonded to confronting areas of the top panel. Any suitable bonding technique, such as soldering, brazing, or the like can be used. The terms "top sheet" and "bottom sheet" as used herein, moreover, are intended only to be descriptive terms and do not limit the installation and operation of the present solar panel.

The top sheet and bottom sheet of the solar panel may be constructed in different configurations and manners from that described hereinabove. By way of example, the elongate channels 93 can extend along the entire length of the bottom sheet 90 and a flat top sheet can be secured onto the bottom sheet; the open ends of the resulting panel can be received in suitable manifolds for connection to the liquid and the vapor sides of the closed system. By way of additional alternative example, the transverse channels 99 and 100 on the top sheet can extend along the entire width of the top sheet for connection with a suitable fluid connection fitting located at the edge of the top sheet. Further yet, the elongate channels and transverse channels of the sheets need not be confined to the U-shaped channels depicted in the Figures, inasmuch as other configurations may provide improved manufacturability or other benefits.

Referring now to FIG. 4, there is shown a typical heating panel 21 as installed in a housing structure, and including the liquid header 28 and vapor header 29 connected to the respective transverse channels of the heating panel. Disposed between each of the liquid and vapor headers is a liquid holding tank 119, connected to the respective headers by conduits 120 and 121. The closed system is initially charged with the selected working fluid in the liquid state, to an extend which may substantially fill the holding tank 119 and, of course, the interconnected elongate channels within the solar panel 21. The one-way valve 40, shown in FIG. 1, maintains the liquid level initially established within the tank 119 and the solar panel. As the liquid within the panel is heated and becomes vaporized, the liquid in the tank 119 flows through the conduit 121 and the liquid header 28 to enter the solar panel, thereby gravitationally providing a supply of liquid in excess of the volumetric capacity of the elongate channels within the solar panel. The conduit 120, in addition to providing pressure equalization across the tank 119, also enables any liquid which enters the vapor header 29, whether by condensation or by splash-over resulting from boiling within the elongate channels of the solar panel, to reenter the tank 119.

Each of the heating panels 21, in addition to being covered by a suitable transparent cover 22 (FIG. 1) which permits substantially unimpeded passage of solar radiation while isolating the solar heating panels from unwanted cooling caused by wind movement or convective currents, is preferably coated with a suitable selective radiation surface coating 96. Heating panel surfaces which are good heat absorbers also are good radiators of absorbed heat, and the provision of a suitable selective radiation coating minimizes the heat loss due to re-radiation of panel heat. It is known that incoming solar radiation received by heating panels has an averge wavelength of approximately 0.5 microns (5,000 Angstroms), while the radiation emitted from the heating panel has an average wavelength of approximately eight microns (80,000 Angstroms). A suitable selective radiation surface for solar heating panels must, accordingly, be a coating having dimensional characteristics which are small compared to the longer emitted wavelength and large compared to the shorter adsorbed wavelength. Such coatings have the property of adsorbing the incoming radiation with a relatively high efficiency and emitting the longer-wavelength radiation at a relatively low rate, such adsorption and emission characteristics resulting from the wave characteristics of electromagnetic radiation.

It has been found that an effective and relatively inexpensive selective radiation coating is provided by coating the solar energy-receiving surface of the heating panels 21 (or, of course, of other types of solar heating panels) with a coating 96 of carbon particles ranging in size from one to five microns. One method of applying such a coating to a metallic surface is provided by directing a lean-burning hydrocarbon flame, such as a propane flame, toward the surface so that the combustion particles of the flame form a coating on the surface. Those skilled in the art will recognize that alternative methods may be used for depositing the particulate coating described above.

Figure 6:
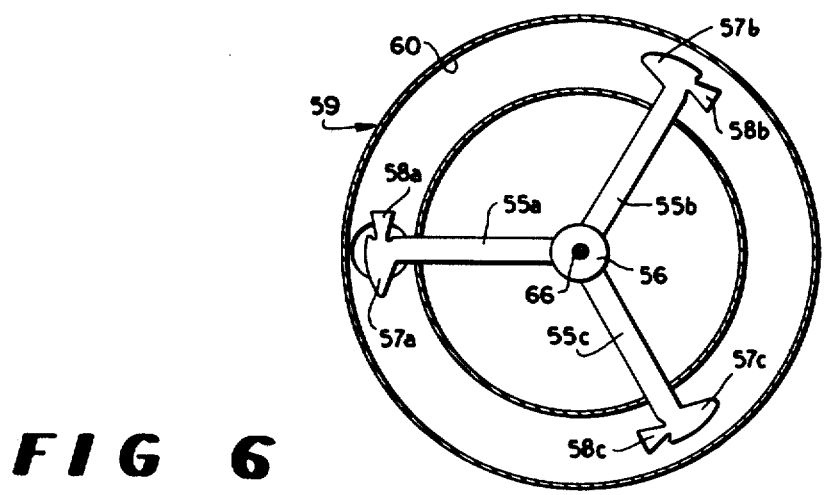
FIG. 6 is a section view taken along line 6—6 of FIG. 5.

The turbine 31, as previously mentioned, may be included in the vapor side of the closed-cycle heat transfer system to extract useful work from the vapor energy provided by the sun, where sufficient vapor energy is available in a particular system or where it is desired to use less than all of the effectively-available heat energy for actual heating purposes. An example of a vapor-driven turbine useful in the present system is shown in FIGS. 5 and 6, and includes a rotor comprised by a number of hollow arms 55a, 55b, and 55c, each of which is connected to and extends radially from a hollow hub 56. A stagnation chamber 57a, 57b, 57c is positioned at the outer end of each corresponding arm 55a–55c, and a correspondingly-identified nozzle 58a–58c exits each of the stagnation chambers tangentially to the respective arms. The arms 55a–55c, with associated stagnation chambers, nozzles, and the hub 56, form a rotating body which is entirely received within a fluid-tight housing indicated generally at 59. It is seen from FIGS. 5 and 6 that there is substantial clearance between the nozzles 58 and the surrounding wall 60 of the fluid-tight housing, so as to provide sufficient area for vapor to flow past the nozzles if the rotor cannot rotate for some reason.

The hub 56 is mounted for rotation on bearing structure 62, and a non-rotating vapor receiving header 63 is connected to the hub 56 by a rotating joint including the rotary sliding seal 64. Any vapor which escapes the hub 56 through the rotary seal 64 will not escape from the closed fluid system, however, inasmuch as the escaped vapor remains within the fluid-tight housing 59 and ultimately exits the turbine through the vapor outlet conduit 65.

The shaft 66 is received within the hub 56, and is mounted for rotation with the hub. Rotary motion of the shaft 66 is coupled through the sealed fluid-tight housing by means of a magnetic couple including the magnet 67 connected at one end of the shaft 66, and the magnetic coupling member 68 disposed in surrounding relation with the magnet 67 on the exterior of the housing 59. It will be evident that the housing 59, at least in the space between the magnet 67 and the magnetic coupling member 68, must be of a suitable material which does not provide magnetic shielding. Magnetic member 68 is suitably mounted for rotation, and the rotating output shaft 69 may be connected to operate a load such as a generator 70 connected to supply electric power to a storage device such as the battery 71.

Considering the operation of the turbine 31, vapor produced in the solar heating panels 21 enters the turbine through the conduit 30 and the header 63, and flows outwardly through the arms 55a-55c to enter the stagnation chambers at the ends of the arms. The flow of vapor through the nozzles 58a-58c produces a thrust force proportional to the pressure difference existing between the exit and the entrance of the nozzle, and the thrust force rotates the turbine rotor and shaft 66 with a force proportional to the developed vapor thrust and the length of the arms 55. Vapor exiting the nozzles 58a-58c, as well as any vapor which may have escaped through the rotary seal 64, flows through the outlet conduit 65 and is supplied to the conduit 32 for passage to the vapor-operated motor 33a and subsequent condensation.

Figure 7:
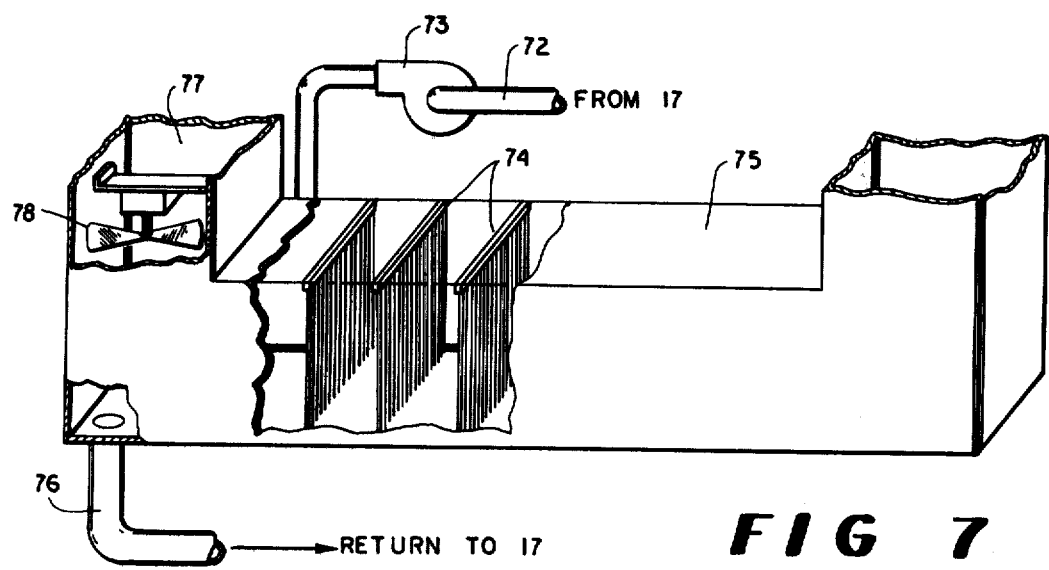
FIG. 7 is a schematic view showing a modified embodiment used to provide air cooling according to the present invention.

Although the system as described thus far has involved the production of heat and the generation of electricity, the system can be modified for the additional purpose of cooling the air within the interior space 14 of the housing structure. This is accomplished in the present embodiment by utilization of the difference in temperature of the air between night and day. Turning to FIG. 7, there is shown a fragmentary view of air cooling apparatus which receives the liquid storage medium from the tank 17 via the conduit 72 and the pump 73. The liquid storage medium is pumped through spray nozzles 74 disposed within an air duct 75, and water from the water spray is collected within the duct and returned to the tank 17 by way of the conduit 76. The air duct 75 is supplied with a forced flow of cool night air from the inlet 77 and the fan 78, so that the temperature of the water or other storage medium within the tank 17 is lowered to the temperature of the outside air. During the following day, the air in the interior space 14 of the structure is circulated through the cooled medium in the tak 17 by forced movement through the ducts 42, or by any other appropriate heat-exchange operation. Although the storage tank 17 in the disclosed embodiment is depicted as being constructed of blocks 81 surrounded by insulation 82 and located alongside the structure 10, it will be apparent that the construction and location of the tank can be varied. A tank location which is at least partially under ground is generally desirable, however, because of the additional insulation provided by the surrounding earth. A buried spherical water storage tank may be a preferred alternative, and such a tank can be fabricated by spraying several inches of urethane foam onto an inflated spherical form. The resulting spherical body of urethane foam, after hardening, is entirely buried in the earth to provide external support for the weight of water within the tank.

Although the solar heating panels 21 in the above-described embodiment of the present invention are depicted as being integral components of the housing structure, other arrangements of solar heating panels may alternatively be used where the particular building structure does not readily adapt itself to a rooftop heating panel arrangement, or where it is desired to add the present solar energy system to an existing house or other structure. By way of example, an array of one or more solar heating panels 21 could be mounted on a support structure which is independent of the building being heated, and suitable plumbing can be provided to supply liquid to the heating panels and to withdraw vapor from the panels. Such separately-mounted heating panels would be more readily amenable to support with an adjustable angle of elevation, so that the panels could be repositioned several times throughout the year to take best advantage of the current prevailing incoming solar radiation.

It will be apparent that the foregoing relates only to a disclosed embodiment of the present invention, and that numerous modifications and changes may be made therein without departing from the spirit and the scope of the invention as defined in the following claims.

What is claimed is:

1. Solar energy receptor panel, comprising:
   a first sheet of material having a substantial coefficient of thermal conductivity;
   said first sheet having at least one elongate channel formed therein by deformation of said material away from a first surface of the sheet;
   said elongate channel being surrounded by undeformed regions of said first surface;
   a second sheet of said material;
   said second sheet having a surface in confronting relation to said first surface of said first sheet;
   said second sheet having at least one first channel deformed in said confronting surface in substantially transverse relation to said elongate channel and intersecting said one elongate channel at a first end thereof;
   said second sheet having at least one second transverse channel defomed in said confronting side and intersecting said one elongate channel at a first end thereof;
   said second sheet having at least one second transverse channel deformed in said confronting side and intersecting said elongate channel at a second end thereof;
   said first surface and said confronting surface being in mutual contact at locations other than said deformations;
   means securing together said first and second sheets at the mutually confronting peripheral regions of said sheets;
   said first surface and said confronting surface being each smooth contacting nonadhering surfaces;
   said channels being defined between said deformations and the confronting surface of the opposed said sheet; and
   a coating of carbon particles deposited on the exterior of at least one sheet of said panel, said particles being sufficiently small to admit incoming solar radiation to said exterior and being sufficiently large to impede energy radiation from said exterior.

2. Apparatus as in claim 1, wherein said carbon particles range in size from about one micron to about five microns.

3. A solar energy receptor panel, comprising:
means defining a surface to receive solar thermal energy; and
a coating of carbon particles disposed on said surface, said particles being sufficiently small to admit incoming solar radiation to said surface and being sufficiently large to impede energy radiation from said surface.

4. Apparatus as in claim 3, wherein said carbon particles range in size from about one micron to about five microns.

* * * * *